United States Patent
Iwashima et al.

(10) Patent No.: US 7,683,511 B2
(45) Date of Patent: Mar. 23, 2010

(54) POWER CONVERTER AND RELATED METHOD

(75) Inventors: Makoto Iwashima, Yokosuka (JP);
Akihiro Hanamura, Yokohama (JP);
Masanori Yamagiwa, Yokohama (JP);
Yasuhiko Kitajima, Kamakura (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 83 days.

(21) Appl. No.: 10/779,613

(22) Filed: Feb. 18, 2004

(65) Prior Publication Data

US 2004/0189114 A1  Sep. 30, 2004

(30) Foreign Application Priority Data

Mar. 25, 2003  (JP)  .......................... P 2003-082873

(51) Int. Cl.
*H02K 11/00* (2006.01)
(52) U.S. Cl. ................................... 310/68 R
(58) Field of Classification Search ............... 310/68 R, 310/52, 58, 64, 68 D; 363/145, 174, 175; 336/61
See application file for complete search history.

(56) References Cited

U.S. PATENT DOCUMENTS

| | | | | |
|---|---|---|---|---|
| 2,942,165 A | * | 6/1960 | Jackson et al. | 257/714 |
| 4,938,280 A | * | 7/1990 | Clark | 165/80.4 |
| 4,963,778 A | * | 10/1990 | Jensen et al. | 310/68 D |
| 5,315,194 A | * | 5/1994 | Brusasco et al. | 310/68 R |
| 5,355,039 A | | 10/1994 | Couture | |
| 5,388,024 A | * | 2/1995 | Galvagni | 361/309 |
| 5,481,433 A | * | 1/1996 | Carter | 361/690 |
| 5,491,370 A | * | 2/1996 | Schneider et al. | 310/54 |
| 5,632,351 A | * | 5/1997 | Ishiyama | 180/65.1 |
| 5,678,646 A | * | 10/1997 | Fliege | 180/65.1 |
| 5,998,893 A | * | 12/1999 | Fowler et al. | 310/68 R |
| 6,097,051 A | * | 8/2000 | Torii et al. | 257/306 |
| 2001/0054730 A1 | * | 12/2001 | Kim et al. | 257/301 |
| 2004/0164625 A1 | * | 8/2004 | Grundl et al. | 310/16 |
| 2004/0183385 A1 | * | 9/2004 | Takahashi et al. | 310/68 D |
| 2005/0029476 A1 | * | 2/2005 | Biester et al. | 251/58 |

FOREIGN PATENT DOCUMENTS

| DE | 2228856 B | * | 4/1978 |
|---|---|---|---|
| DE | 44 22 623 A1 | | 1/1996 |

(Continued)

OTHER PUBLICATIONS

Japanese Office Action dated Jul. 12, 2005 in Japanese Application No. JP 2003-082873.

*Primary Examiner*—Nguyen N Hanh
(74) *Attorney, Agent, or Firm*—McDermott Will & Emery LLP (57) ABSTRACT

A power converter that is arranged in series with a motor to form a unitary structure through which an output shaft extends is provided with a plurality of coolers and a power semiconductor module mounted on a cooling surface of at least one of the plurality of coolers to supply electric power to a motor. Each of the plurality of coolers is disposed along an extending direction radially extending from an output shaft to be perpendicular to the output shaft. The cooling surface is provided along such an extending direction.

19 Claims, 10 Drawing Sheets

FOREIGN PATENT DOCUMENTS

| | | | |
|---|---|---|---|
| DE | 10112799 C1 * | 10/2002 | |
| JP | 2-266855 A | 10/1990 | |
| JP | 5-25988 A | 4/1993 | |
| JP | 5-292703 | 11/1993 | |
| JP | 7-231672 A | 8/1995 | |
| JP | 7-245968 A | 9/1995 | |
| JP | 7-288949 A | 10/1995 | |
| JP | 7-298552 A | 11/1995 | |
| JP | 2005-504493 A | 2/2005 | |

* cited by examiner

POWER CONVERTER AND RELATED METHOD

BACKGROUND OF THE INVENTION

The present invention relates to a power converter and a related method, more particularly, to a power converter adapted to convert DC power to AC power to obtain driving electric power by which an AC motor is driven and its related method.

Japanese Patent Application Laid-Open Publication No. 5-292703 discloses a structure wherein coolers are located between a motor and a power converter to cool both the motor and the power converter, and the motor and the power converter are unitarily formed by means of the coolers to allow power semiconductor modules of the power converter to be forcibly cooled by the coolers.

SUMMARY OF THE INVENTION

However, upon careful studies undertaken by the present inventors, such a structure suffers from an increase in size of the power semiconductor modules, by which DC power is converted to AC power, while resulting in an increase in size of the coolers, in case where a demanded power of the motor increases, that is, resulting in a tendency wherein a radial cross sectional area that is needed by the power converter becomes greater than that of the motor. That is, in view of the structure where the motor and the power converter are unitarily formed, such a structure results in a configuration that is larger in size than necessary.

Therefore, the present invention has been completed upon such studies by the present inventors, and has an object to provide a power converter that is small in size and has an excellent cooling capability even in case where a demanded power rate of a motor increases and its related method.

To achieve the above object, in one aspect of the present invention, there is provided a power converter arranged in series with a motor to form a unitary structure through which an output shaft extends, comprising: a plurality of coolers each of which is disposed along an extending direction radially extending from an output shaft to be perpendicular to the output shaft, with each of the plurality of coolers having a cooling surface along the extending direction; and a power semiconductor module mounted on the cooling surface of at least one of the plurality of coolers to supply electric power to a motor.

On the one hand, in another aspect of the present invention, there is provided a method of arranging a cooler and a power semiconductor module in a power converter to be formed in series with a motor in a unitary structure through which an output shaft extends, the method comprising: locating a plurality of coolers along an extending direction radially extending from an output shaft to be perpendicular to the output shaft, with each of the plurality of coolers having a cooling surface along the extending direction; and mounting a power semiconductor module on the cooling surface of at least one of the plurality of coolers to supply electric power to a motor.

Other and further features, advantages, and benefits of the present invention will become more apparent from the following description taken in conjunction with the following drawings.

DETAILED DESCRIPTION OF THE PREFERRED EMBODIMENTS

Hereunder, a power converter and its related method of each of various embodiments of the present invention are described in detail with reference to the accompanying drawings. Also, although the power converter is described in conjunction with an example wherein the power converter typically take a structure united with a motor and applied to a vehicle, the present invention is not limited to such a vehicle as an electric vehicle employing only a motor as a drive source but may be applicable to a hybrid vehicle that uses a motor and an engine in combination or a vehicle such as a fuel cell powered vehicle in which electric power is obtained from a fuel cell.

First Embodiment

First, a power converter and its related method of a first embodiment of the present invention are described in detail with reference to FIGS. 1 to 11B.

Figure 1:
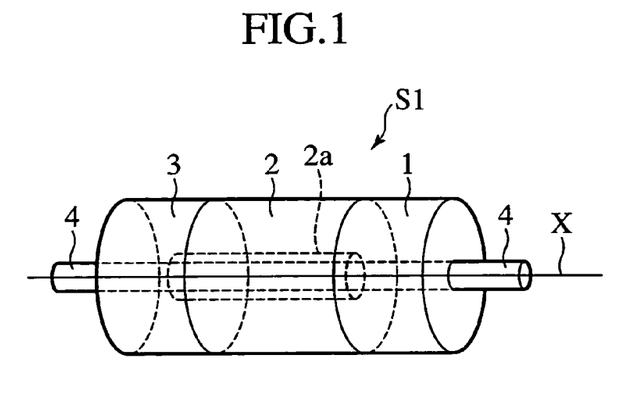
FIG. 1 is a perspective view illustrating an external structure of a unitary device incorporating a power converter and a motor of a first embodiment according to the present invention.
Figure 2:
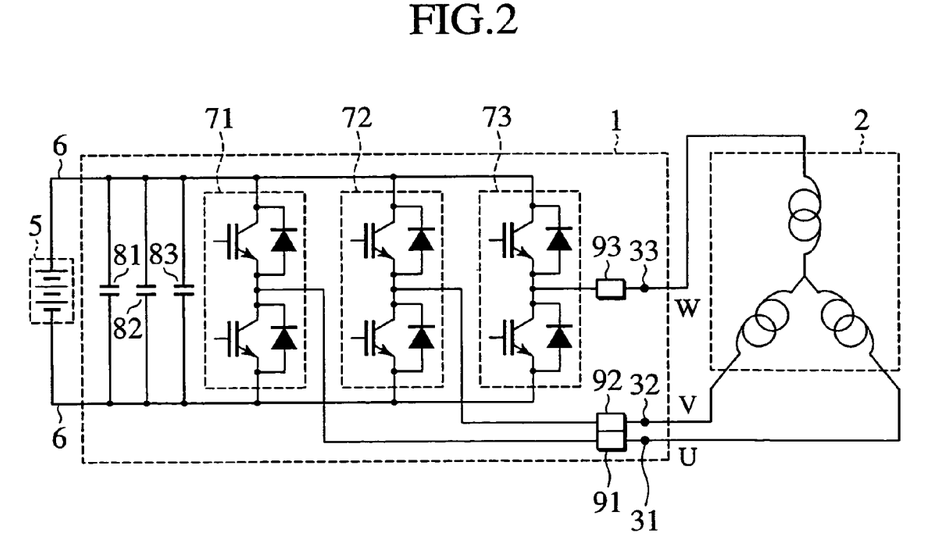
FIG. 2 is a power outline system diagram of an electric automobile drive system employing the power converter of the present embodiment.
Figure 3A:
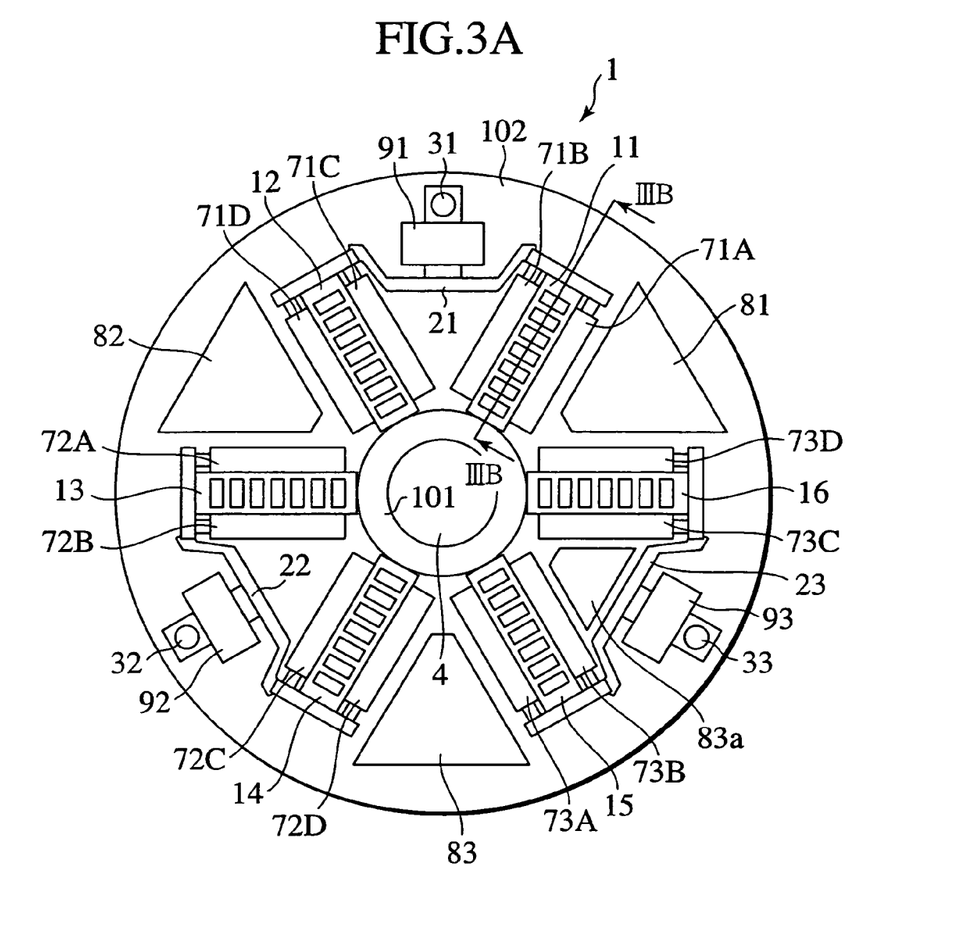
FIG. 3A is a side view of showing an internal structure of the power converter in skeleton form of the present embodiment.
Figures 3B, 3C:
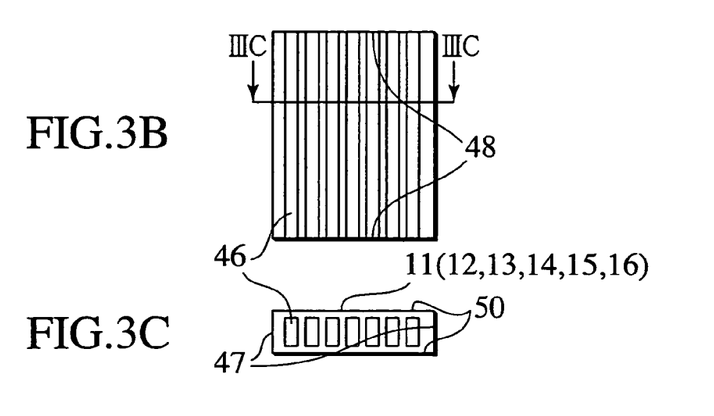
FIG. 3B is a cross sectional view of one cooler taken on line IIIB-IIIB of the power converter shown in FIG. 3A.
FIG. 3C is a cross sectional view taken on line IIIC-IIIC of the cooler shown in FIG. 3B.
Figure 4:
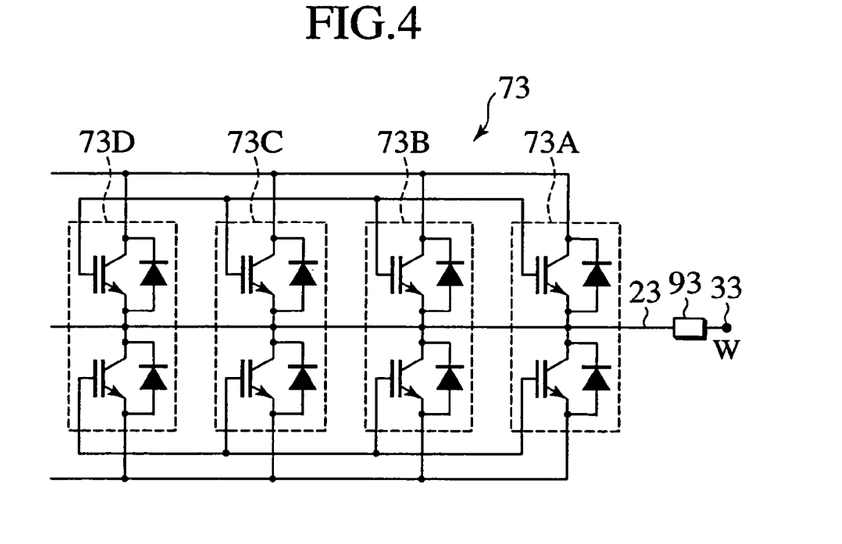
FIG. 4 is a power outline system diagram for generation of a W-phase electric power of the present embodiment.
Figure 5:
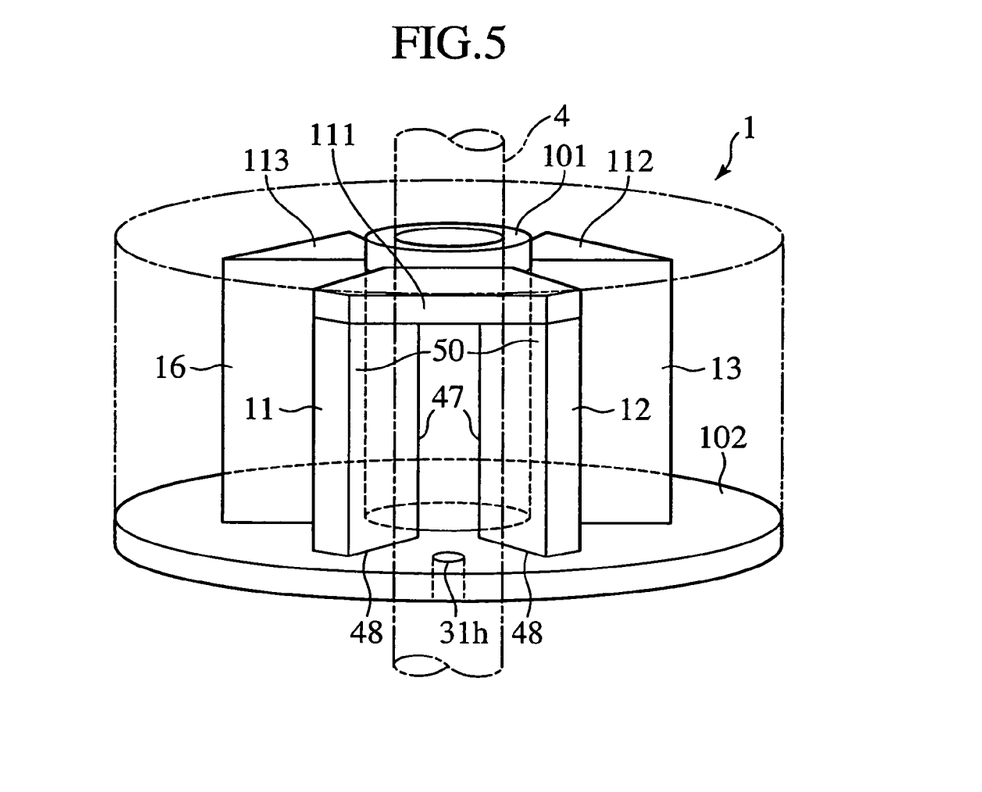
FIG. 5 is a perspective view illustrating the coolers of the power converter of the present embodiment.
Figure 6:
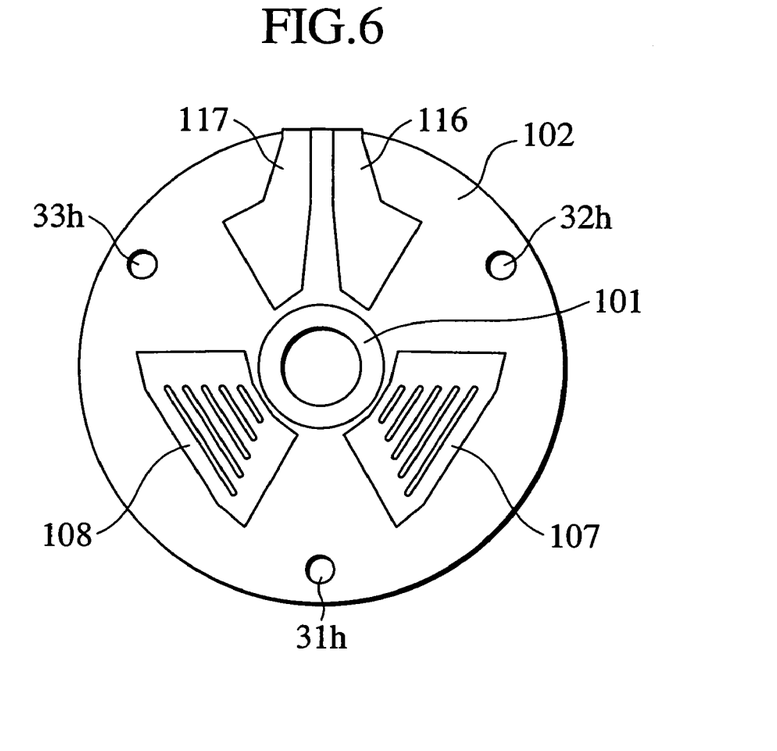
FIG. 6 is a view illustrating a conduit arrangement pattern of a structural member of the power converter at an end face of the motor of the present embodiment.
Figure 7:
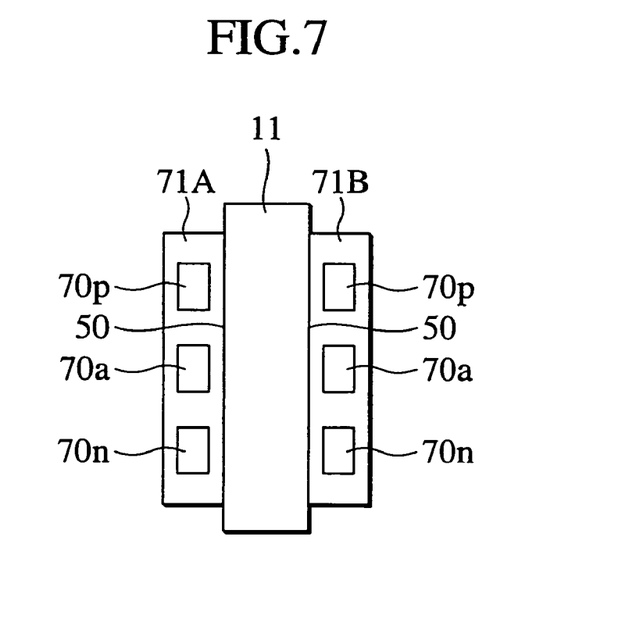
FIG. 7 is a view showing a terminal layout of power semiconductor modules associated with one cooler of the present embodiment.

FIG. 1 is a perspective view illustrating an external structure of a unitary device incorporating a power converter and a motor of the present embodiment, FIG. 2 is a power outline system diagram of an electric automobile drive system employing the power converter, FIG. 3A is a side view of showing an internal structure of the power converter in skeleton form, FIG. 3B is a cross sectional view of one cooler taken on line IIIB-IIIB of the power converter shown in FIG. 3A, FIG. 3C is a cross sectional view taken on line IIIC-IIIC of the cooler shown in FIG. 3B, FIG. 4 is a power outline system diagram for generation of a W-phase electric power, FIG. 5 is a perspective view illustrating the coolers of the power converter, FIG. 6 is a view illustrating a conduit arrangement pattern of a structural member of the power converter at an end face of the motor, and FIG. 7 is a view showing a terminal layout of power semiconductor modules associated with one cooler.

As shown in FIG. 1, with a unitary device S1 that includes a power converter 1, a motor 2 and a gear 3 connected in a unitary structure so as to lie on a central axis X, the power converter 1 is disposed in series with the motor 2 so as to coaxially lie on a motor shaft 2a of the motor 2. The motor 2 is driven with AC electric power outputted from the power converter 1, and a rotational output of the motor shaft 2a of the motor 2 is transferred to the gear 3 that is united with the motor 2 in opposition to the power converter 1.

A drive shaft 4 has a central axis concentric with the motor shaft 2a and extends through the power converter 1, the motor 2 and the gear 3. In particular, a portion of the drive shaft 4 that extends through the power converter 1 is covered with a cylindrical structural member 101 by which the drive shaft 4 is surrounded, and the structural member 101 is integrally formed with a structural member 102 at an end face of the motor 2 (see FIG. 3A). Further, a portion of the drive shaft 4 that extends through the motor 2 takes the form of a structure that allows the drive shaft 4 to extend through the motor shaft 2a.

The rotational output of the motor shaft 2a of the motor 2 transferred to the gear 3 is delivered to the drive shaft 4 that meshes with the gear 3, and then transferred through the drive shaft 4 and an associated subsequent stage of a power transfer line to wheels such as left and right wheels to drive a vehicle.

With respect to the power system of an electric automobile drive system employing the power converter 1, as shown in FIG. 2, the power converter 1 serves to convert DC electric power, supplied from a battery 5 via power supply lines 6, into AC electric power, through switching operations of incorporated power semiconductor modules 71 to 73, which is supplied to the motor 2 as driving electric power.

More particularly, in case where the motor 2 includes an AC motor having U-phase, V-phase and W-phase, the power converter 1 has a total of three power semiconductor modules 71 to 73 whose respective output terminals provide AC power in the U-phase, V-phase and W-phase to be inputted to the associated phases of the motor 2 through electric current sensors 91 to 93.

On the one hand, the respective power semiconductor modules 71 to 73 are applied with DC voltage supplied from the battery 5 through the power supply lines 6. Additionally, smoothing capacitors 81 to 83 are connected to the power supply lines 6 in parallel with the power semiconductor modules 71 to 73. The smoothing capacitors 81 to 83 serves as capacitors for smoothing DC voltage supplied from the battery 5, and in view of the need for the capacitors to have large capacities because of the presence of large electric power required for driving the motor 2, it is normal practice to employ a plurality of capacitors that are connected in parallel.

Also, the power semiconductor modules 71 to 73 include pairs of power semiconductor elements such as IGBTs (Insulated Gate Bipolar Transistors), with connecting points of respective pairs forming output terminals. Moreover, diodes are connected in parallel and in reverse to the respective power semiconductors. In FIG. 2, while individual one of the power semiconductor modules 71 to 73 is used for AC current one-phase, a plurality of pieces of power semiconductor modules may be employed in parallel connection for the AC current one-phase when needed to supply the motor 2 with large electric power.

Further, although a control system for controllably switching the power semiconductor modules 71 to 73 for converting DC power to AC power has been omitted in FIG. 2, due to the need for measuring electric currents flowing through three-phase AC currents (in U-phase, V-phase and W-phase) in order to controllably convert DC power to AC power, the electric current sensors 91 to 93 are disposed inside of the power converter 1.

Next, an internal structure of the power converter 1 is described in concrete with reference to FIGS. 3A to 7. Incidentally, FIG. 3A is viewed from a side opposite to that in which the power converter 1 is mounted to the motor 2, and in FIG. 3A, a part of the internal structure of the power converter 1 is omitted for the sake of convenience of description.

As shown in FIG. 3A, coolers 11 to 16 have both flat surfaces, respectively, which are formed with flat portions to allow the power semiconductor modules 71A to 71D, 72A to 72D and 73A to 73D to be mounted thereon, respectively. Referring to FIGS. 3B and 3C that typically illustrate an internal cross sectional structure of the cooler 11 (with all of the coolers 11 to 16 remaining in the same structure), the cooler 11 has a plurality of coolant passages 46 to permit coolant to flow. Here, the coolers 11 to 16 are disposed to radially extend from a center of the drive shaft 4 that extends through the motor shaft 2a, that is, disposed in the radial directions of the power converter 1 at equidistantly spaced angular positions to be perpendicular to the drive shaft 4. Incidentally, it is needless to say that a similar structure may be adopted in a case where the motor shaft 2a is further lengthened and extends through the power converter 1.

That is, the power semiconductor modules 71A to 71D, 72A to 72D and 73A to 73D are disposed in a layout so as to sandwich the coolers 11 to 16, respectively. It is, of course, not objectionable that if a situation demands, such power semiconductor modules may not be placed on both surfaces of each cooler but may be placed on only one surface thereof. AC power output resulting from AC output electrodes (bus bars) 21 to 23, which collect AC outputs of the power semiconductor modules 71A to 71D, 72A to 72D and 73A to 73D, flow through the electric current sensors 91 to 93, for detecting output currents in U-phase, V-phase and W-phase, is supplied to the motor 2 through the AC output terminals 31 to 33 adapted to supply AC power output resulting from the power converter 1 to the motor 2. Disposed at DC inputs are the smoothing capacitors 81 to 83 with large capacities for smoothing DC voltage resulting from the battery 5.

Among the structures shown in FIG. 3A, the power semiconductor modules 73 are arranged such that four pieces of power semiconductor modules 73A to 73D are connected in parallel to allow AC power in W-phase to be outputted as shown in FIG. 4 that illustrates a power outline system diagram of the W-phase of the AC three-phase.

Here, as shown in FIG. 3A and also FIG. 5 that is a perspective view aiming at a structure associated with the coolers 11 to 16 for the ease of description, the coolers 11 to 16 are disposed about the center of the drive shaft 4 in radial directions at circumferentially distanced positions spaced at an angle of 60°.

Cooling surfaces 50 and the coolant passages 46 (see FIG. 3B) of the coolers 1 to 16 are placed so as to extend in parallel to the drive shaft 4. Side surfaces 47 of the coolers 11 to 16 on one side are coupled to the cylindrical structural member 101 by which the drive shaft 4 is surrounded.

End portions 48 of the coolers 11 to 16 on one side are coupled to a structural member 102 placed at an end face of the motor 2 and, as shown in FIG. 6, the structural member 102 is formed with delivery conduits 107, 108, through which the respective coolant passageways 46 are connected between the coolers 12 and 13 and between the adjacent coolers 11 and 16, and in addition, coolant delivery conduits 116, 117 through which coolant enters to and flows back from the power converter 1.

On the other hand, the other end portions 48 of the coolers 11 to 16 are connected to delivery conduits 111 to 113 through which the respective coolant passages 46 are connected between the adjacent coolers 11 and 12, the adjacent coolers 13 and 14 and the adjacent coolers 15 and 16. That is, all the coolers 11 to 16 are enabled to allow coolant to flow in a series relationship.

As shown in FIG. 7 by which the structure associated with the cooler 11 is typically shown, the power semiconductor modules 71A to 71D, 72A to 72D and 73A to 73D are mounted to the cooling surfaces 50 so as to allow both the cooling surfaces 50 of the respective coolers 11 to 16 to be sandwiched. Disposed on side surfaces, closer to an outer peripheral surface shown in FIG. 3A, are input and output terminals (positive electrode power supply terminals 70$p$, negative electrode power supply terminals 70$n$ and AC output terminals 70$a$).

Here, the power semiconductor modules 71A and 71B, 72A and 72B and 73A and 73B, 71C and 71D, 72C and 72D and 73C and 73D, which are mounted on both surfaces of one cooler, take a structure in which input and output terminals (the positive electrode power supply terminals 70$p$, the negative electrode power supply terminals 70$n$ and the AC output terminals 70$a$) have mutually symmetric relationships with respect to the respective cooler 11 to which the power semiconductor modules are attached, with the cooler 11 being sandwiched, as shown in FIG. 7.

Turning back to FIG. 3A again, connected to the AC output terminals 70$a$ of the power semiconductor modules 71A to 71D, 72A to 72D and 73A to 73D, respectively, are AC output electrodes (bus bars) 21 to 23, which are in turn connected to the current sensors 91 to 93, respectively. The current sensors 91 to 93 are connected to the AC output terminals 31 to 33 through which AC power is supplied to the motor 2. Also, the current sensors 91 to 93 and the AC output terminals 31 to 33 are disposed in radial directions at circumferentially spaced intervals between the coolers 11 to 16 and, moreover, the electrodes (bus bars which are not shown) connected to the AC output terminals 31 to 33 extend through through-bores 31$h$, 32$h$, 33$h$ (see FIG. 6) formed in the structural member 102 at the end face of the motor 2 and are connected to the three-phase windings of the motor 2.

Figure 8A:
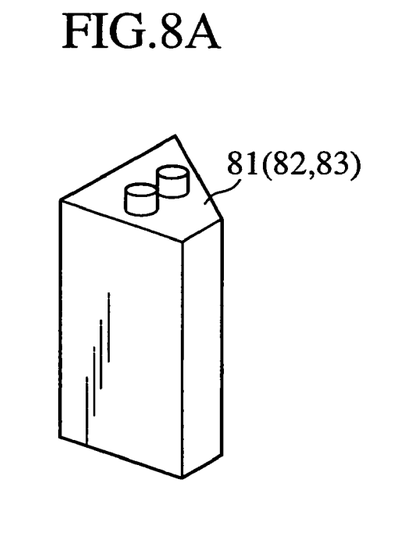
FIG. 8A is a perspective view illustrating a structure of a smoothing capacitor with a cross sectional shape in trapezoid of the present embodiment.

Further, the smoothing capacitors 81 to 83 are also disposed between the coolers 1 to 16 that are disposed in the radial directions at the circumferentially spaced intervals. In particular, the smoothing capacitors 81 to 83 have cross sectional shapes in trapezoid as shown in FIG. 8A, which is a perspective view illustrating a structure of such a smoothing capacitor with a cross sectional shape in trapezoid, and take the shapes to be placed between the coolers 11 to 16 with no clearances.

Figure 8B:
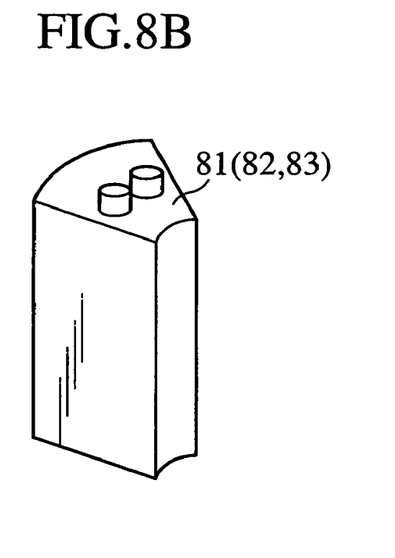
FIG. 8B is a perspective view illustrating a structure of a smoothing capacitor with a cross sectional shape in fan-shape of the present embodiment.

Incidentally, the cross sectional shapes of the smoothing capacitors 81 to 83 are not limited to the trapezoid and, as shown in FIG. 8B which is a perspective view illustrating a structure of such a smoothing capacitor with a cross sectional shape in fan-shape, the use of smooth capacitors with fan-shaped configurations provides the same effects.

Moreover, using film capacitors or ceramic capacitors for the smoothing capacitors 81 to 83 enables capacitors with such complicated structures to be easily made.

Figure 9:
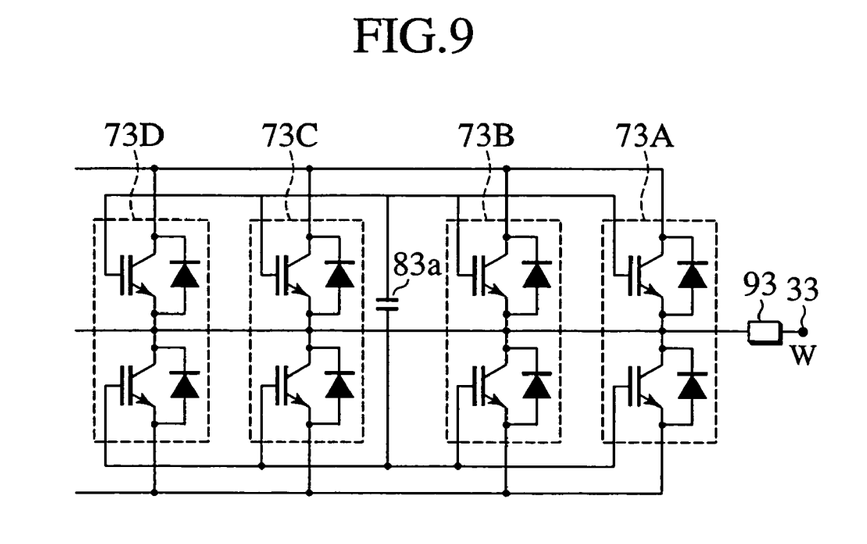
FIG. 9 is a power outline system diagram incorporating a smoothing capacitor with the cross sectional shape in trapezoid of the present embodiment.

In addition, as shown in FIG. 3A, a smoothing capacitor 83$a$, which has a cross sectional shape having a similar trapezoid and exibits an excellent high frequency characteristic, is disposed. Such a structure is of the type in which in an electrical point of view as shown in FIG. 9 which is a power outline system diagram incorporating such a smoothing capacitor with the cross sectional shape in trapezoid, the capacitor 83$a$ is connected between the positive and negative electrodes (bus bars) leading from the battery (see FIG. 2) at a symmetric position in the immediate vicinity of the power semiconductor modules 73A, 73B and 73C, 73D, by which the three-phase power in the W-phase is provided, with respect thereto, high frequency noises resulting during switching operations of the power semiconductor modules 73A to 73D can be efficiently erased. Incidentally, only the W-phase of the three-phase AC power has been commented, similar effects are resulted in the U-phase and the V-phase. Furthermore, though not herein shown in the drawings, the positive and negative electrodes (bus bars) to which DC voltage is applied from the battery 5 through the power supply lines 6 are disposed such that these electrodes are overlapped with an insulation layer being interposed at areas except for those connected to respective component parts so as to lie on the shortest distance between the respective component parts.

With the structure of the presently filed embodiment set forth above, since the coolers 11 to 16 are accommodated in three dimensions, a large number of power semiconductor modules can be mounted with no increase in size in the radial direction. Also, since the power semiconductor modules can be mounted on both the cooling surfaces 50 of the coolers 11 to 16, a further increased number of power semiconductor modules can be mounted.

Due to an ability of permitting such a large number of power semiconductor modules to be mounted, an AC output power can be increased without causing an increase in size of the power converter. Incidentally, in case not only where a large AC output power is required but also in case where a further increased cooling effect is required during occurrence of large amount of heat built up in the power semiconductor modules, it is apparent that the power semiconductor modules can mounted on only one surface of each cooler.

Further, due to the presence of the coolers 11 to 16 being placed in the radial directions, it becomes possible for the respective components parts, involving the power semiconductor modules and smoothing capacitors, to be placed among the AC three phases (U-phase, V-phase and W-phase) in mutually equalized positions, enabling surge voltages and heat built up to entirely and uniformly occur.

Furthermore, since the side surfaces 47 and the end portions 48 of the coolers 11 to 16 are mounted on the structural members 101, 102, respectively, the power converter 1 is enabled to enhance an increased strength and rigidity.

Moreover, since coolers 11 to 16 are provided with the plural coolant passages 46 straightly formed to admit the flow of coolant, it becomes possible to uniformly cool the entire surfaces of the power semiconductor modules mounted on the coolers 11 to 16.

Further, since the end portions 48 of the coolers 11 to 16 are connected to the coolant passages 46 of the adjacent coolers 11 and 12, 12 and 13, 14 and 15, 15 and 16, 16 and 11 and the coolant delivery conduits 116, 117 through which coolant enters to and flows back from the power converter 1, coolant can be admitted to all of the coolers 11 to 16 in a serial manner.

Figure 10:
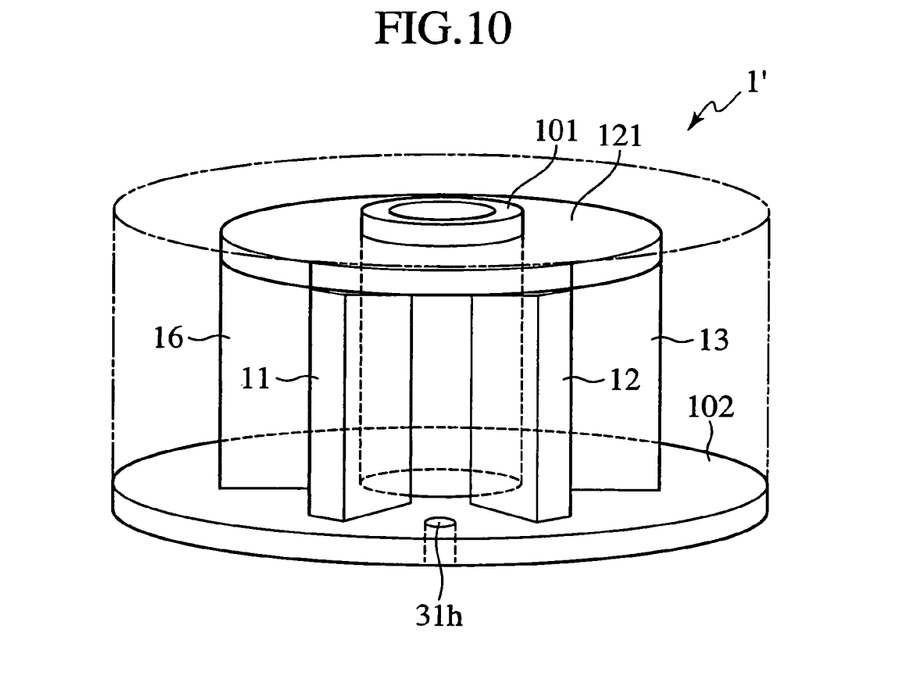
FIG. 10 is a perspective view of the coolers associated with an annular conduit of the present embodiment.
Figure 11A:
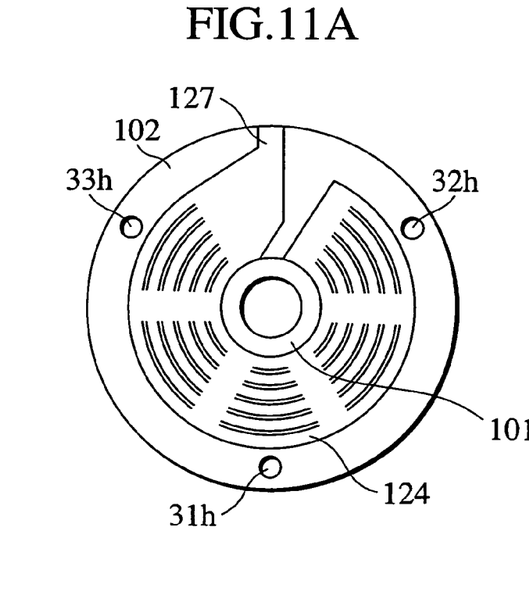
FIG. 11A is a view illustrating a conduit arrangement pattern of the annular conduit of the present embodiment.
Figure 11B:
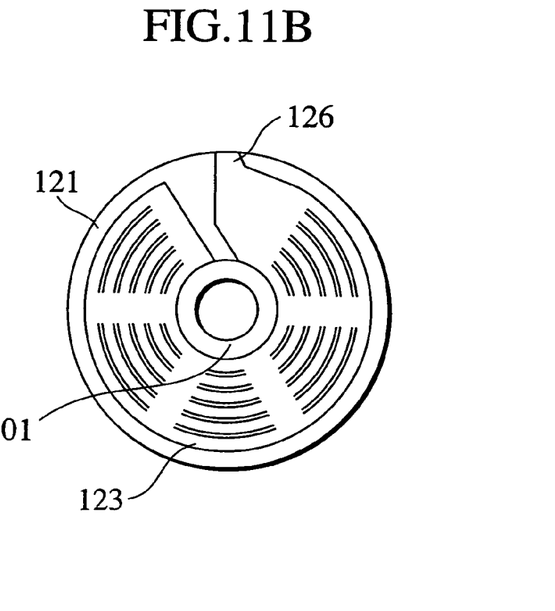
FIG. 11B is a view illustrating a conduit arrangement pattern of a structural member at an end face of the motor of the present embodiment.

Incidentally, the connecting relationship between the end portions 48 of the coolers 11 to 16 may not be of the serial type but may be of a parallel type. In particular, as shown in FIG. 10 which is a perspective view of the coolers associated with an annular conduit, FIG. 11A which is a view illustrating a conduit arrangement pattern of the annular conduit and FIG. 11B which a view illustrating a conduit arrangement pattern of a structural member at an end face of the motor, locating the coolers 11 to 16 between an annular delivery conduit 121 (see FIG. 11B) formed with the coolant delivery conduit 126, leading to and extending from the power converter 1', and a plurality of annular coolant passageways 123, and the structural member (see FIG. 11A) 102 at the motor end face formed with the plural annular coolant passageways 124 and the coolant delivery conduit 127 leading to and extending from the power converter 1' enables coolant to pass through all of the coolers 11 to 16 in parallel relationships.

Further, since the power semiconductor modules 71A and 71B, 72A and 72B, 73A and 73B, 71C and 71D, 72C and 72D and 73C and 73D to be mounted on both surfaces of one cooler include power semiconductor modules which permit the respective input and output terminals (positive electrode power supply terminals 70p, negative electrode power supply terminals 70n and AC output terminals 70a) to be located in symmetry with respect to the cooler which is interleaved, it is possible to shorten the length of wirings of the AC output electrodes (bus bars) 21 to 23 and the positive and negative electrodes (bus bars), to which DC voltage is applied through the power supply lines 6, to the minimum length while providing an ease to achieve wirings.

Furthermore, since the cross sectional shapes of the smoothing capacitors 81 to 83 are formed in the trapezoid or fan-shape and disposed between the coolers 11 to 16, the smoothing capacitors 11 to 16 can be positioned between the coolers 11 to 16 with no clearance, resulting in a capability of achieving space-saving of the power converter.

Second Embodiment

Figure 12:
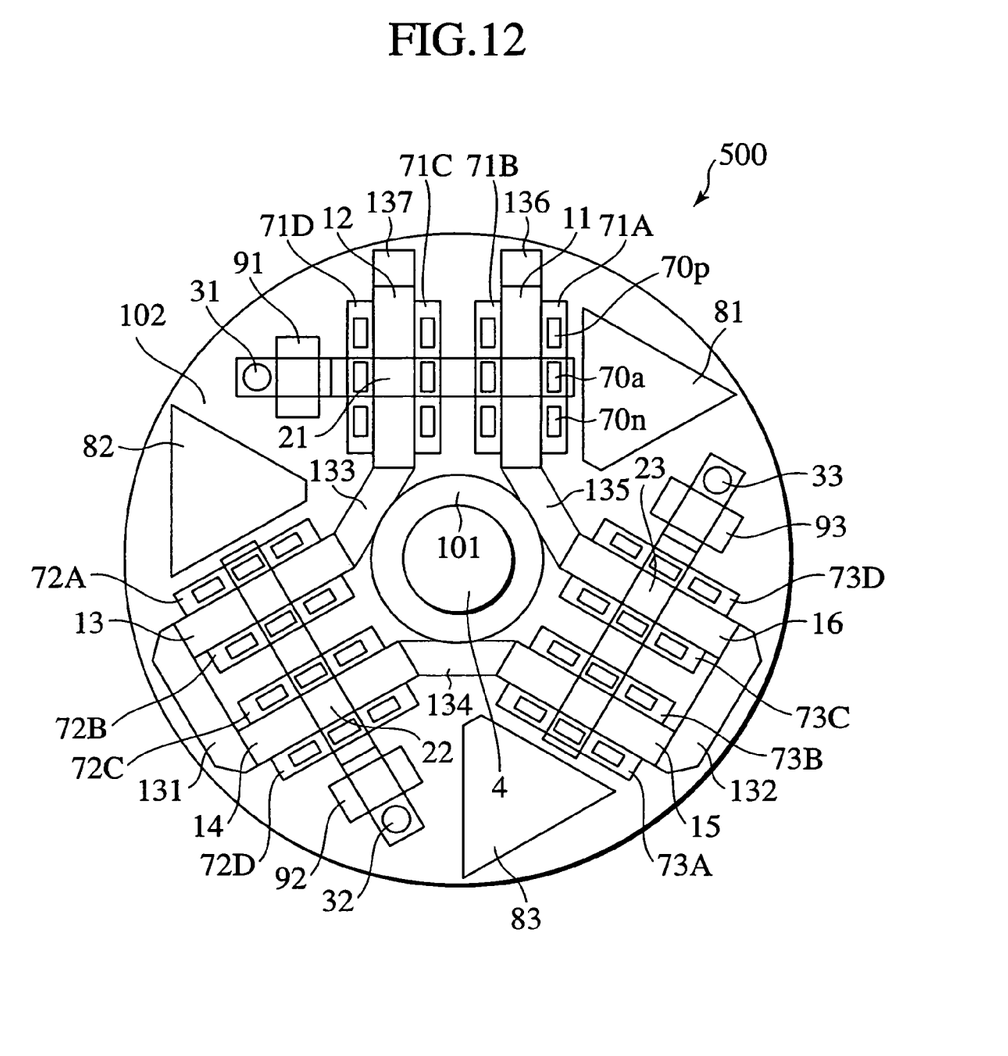
FIG. 12 is a side view showing an internal structure of a power converter, in skeleton form, of a second embodiment according to the present invention.
Figure 13:
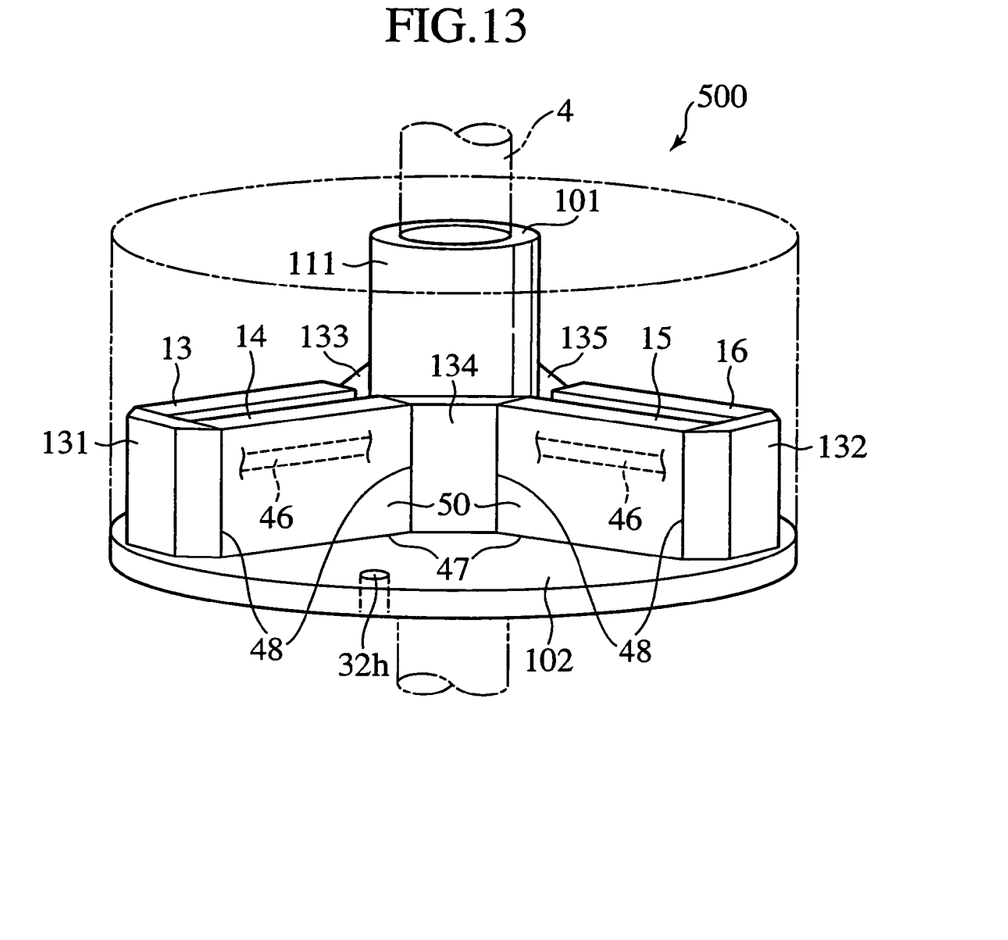
FIG. 13 is a perspective view showing coolers of the power converter of the present embodiment.

A power converter 500 and its related method of a second embodiment of the present invention are described in detail mainly with reference to FIGS. 12 and 13. The power converter of the presently filed embodiment mainly differs from the first embodiment in respect of a layout structure in which the coolers are placed, and can be suitably applied to a case where a radial size of a motor is relatively greater than a requisite radial size of the power converter. Also, in the presently filed embodiment, the same component parts as those of the first embodiment bear the same reference numerals to suitably omit description or to provide description in a simplified form.

FIG. 12 is a side view showing an internal structure of the power converter 500 of the presently filed embodiment in a skeleton form as viewed from a side opposite to that on which a motor is mounted, and FIG. 13 is a perspective view illustrating coolers of such a power converter.

As shown in FIGS. 12 and 13, the coolers 11 to 16 of the presently filed embodiment differ from those shown in FIGS. 3A and 5 and are disposed about a center of the drive shaft 4 in pairs in parallel to line segments along radial directions, that is, disposed in juxtaposition in radial directions so as to allow pairs of coolers 11 and 12, 13 and 14 and 15 and 16 to be parallel to the radial directions of the power converter 500.

More particularly, the coolers 11 to 16 take the form of a layout in which long sides of the coolers 11 to 16 shown in FIG. 5 are laid so as to extend in the radial directions. That is, the side surfaces 47 of the coolers 11 to 16 are mounted on the structural member 102 at the end face of the motor 2, respectively. On the other hand, both ends 48 of the coolers 11 to 16 are connected to delivery conduits 131 to 135, through which the coolant passageways 46 of the adjacent coolers 13 and 14, 15 and 16, 12 and 13, 14 and 15 and 16 and 11 communicate with one another, and coolant delivery conduits 136, 137 that allow coolant to enter to or flows back from the power converter 1.

The power semiconductor modules 71A to 71D, 72A to 72D and 73A to 73D are mounted on both the cooling surfaces 50 of the coolers 11 to 16 like in the first embodiment, and the input and output terminals (positive electrode power supply terminals 70p, negative electrode power supply terminals 70n and AC output terminals 70a) are disposed to be opposite to the motor 2.

Here, the power semiconductor modules 71A and 71B, 72A and 72B, 73A and 73B, 71C and 71D, 72C and 72D and 73C and 73D mounted on both the cooling surfaces 50 of one cooler are disposed such that the input and output terminals (positive electrode power supply terminals 70p, negative electrode power supply terminals 70n and AC output terminals 70a) are placed in mutually symmetric relations with respect to the cooler which is interleaved.

Connected to the AC output terminals 70a of the power semiconductor modules 71A to 71D, 72A to 72D and 73A to 73D, respectively, are AC output electrodes (bus bars) 21 to 23 which extend through the current sensors 91 to 93, respectively, and are connected to the AC output terminals 31 to 33 through which AC power is supplied to the motor 2. Incidentally, the current sensors 91 to 93 and the AC output terminals 31 to 33 are disposed between the coolers 11 to 16 which are spaced from one another in the radial directions. Moreover, the electrodes (bars) connected to the AC output terminals 31 to 33 extend through the structural member 102 at the end face of the motor 2 and connected to the three-phase wirings of the motor 2 like in the first embodiment.

The smoothing capacitors 81 to 83 are also disposed between the coolers 11 to 16 which are spaced from one another in the radial directions. Here, the smoothing capacitors 81 to 83 have the cross sectional shapes in trapezoid as shown in FIG. 9 and are located between the coolers 11 to 16 with no clearance. Incidentally, though not shown in the drawings, the positive and negative electrodes to which DC voltage is applied from the battery 5 through the power supply lines 6 are disposed such that these electrodes are overlapped, with an insulation layer being interleaved, at areas except for those in which the respective component parts are connected, in the shortest distance between the respective component parts.

With the structure of the presently filed embodiment set forth above, since the coolers 11 to 16 are accommodated in more filled-up manner, a large number of power semiconductor modules can be mounted with no increase in size in the radial directions.

Also, since the power semiconductor modules can be mounted on both the cooling surfaces 50 of the coolers 11 to 16, a further increased number of power semiconductor modules can be mounted.

Due to an ability of mounting such a large number of power semiconductor modules, an output increase in AC power can be achieved without increasing the power converter.

Further, since the coolers 11 to 16 are appropriately placed in pairs about the center of the drive shaft in parallel to the line segments extending in the radial directions, the respective components parts, involving the power semiconductor modules and smoothing capacitors, can be placed among the AC three phases in mutually equalized positional relationships, enabling surge voltages and heat built up to entirely occur in a uniform manner.

Furthermore, since the side surfaces 47 of the coolers 11 to 16 are mounted on the structural member 102 at the end face of the motor 2, the power converter 1 is enabled to have an increased strength and rigidity, and the thickness of the power converter can be made small in thickness while permitting an area, opposite to the motor 2, to incorporate the component parts in a layout with a relatively free design.

Moreover, since the plurality of coolant passages 46 for admitting coolant to internally flow through the coolers 11 to 16 are straightly formed, an advantageous effect resides in that the entire surfaces of the power semiconductor modules 71A to 71D, 72A to 72D and 73A to 73D mounted on the coolers 11 to 16 can be uniformly cooled.

Further, since the end portions 48 of the coolers 11 to 16 are connected to the coolant passages 131 to 135 of the adjacent coolers 13 and 14, 15 and 16, 12 and 13, 14 and 15 and 16 and 11 and the coolant delivery conduits 136, 137 through which coolant enters to and flows back from the power converter 1, coolant can be admitted to all of the coolers 11 to 16 in a serial manner.

Further, since the power semiconductor modules 71A and 71B, 72A and 72B, 73A and 73B, 71C and 71D, 72C and 72D and 73C and 73D mounted on both surfaces of one cooler are structured such that respective input and output terminals (positive electrode power supply terminals 70p, negative electrode power supply terminals 70n and AC output terminals 70a) are mounted on the cooler in symmetry with respect to one another in a manner to allow the cooler to be interleaved, the wirings of the AC output electrodes (bus bars) 21 to 23 and the positive and negative electrodes (bus bars), to which DC voltage is applied through the power supply lines 6, can be shortened to the minimum length while providing an ease to achieve wirings.

Furthermore, since the cross sectional shapes of the smoothing capacitors 81 to 83 are formed in the trapezoid and disposed between the coolers 11 to 16, the smoothing capacitors 11 to 16 can be positioned between the coolers 11 to 16 with no clearance, resulting in a capability of achieving space-saving of the power converter. Also, the same effect can be obtained through the use of the smoothing capacitors 81 to 83 with no trapezoid cross sectional shape but with the fan-shaped cross sectional shape.

Third Embodiment

A power converter and its related method of a third embodiment of the present invention are described in detail mainly with reference to FIGS. 14 to 18. The power converter of the presently filed embodiment mainly differs from the first embodiment in respect of an outer shape thereof, and is available to be suitably applied to a case where a radial size of a motor is relatively smaller than a requisite radial size of the power converter. Also, in the presently filed embodiment, the same component parts as those of the first embodiment bear the same reference numerals to suitably omit description or to provide description in a simplified form.

Figure 14:
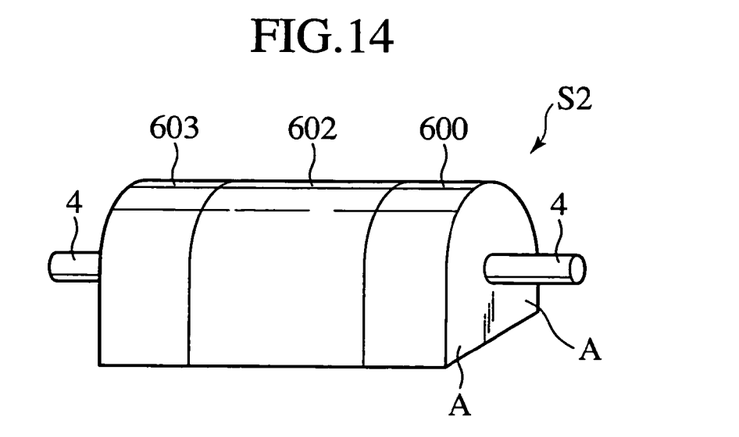
FIG. 14 is a perspective view illustrating an external structure of a unitary device incorporating a power converter and a motor of a third embodiment according to the present invention.
Figure 15:
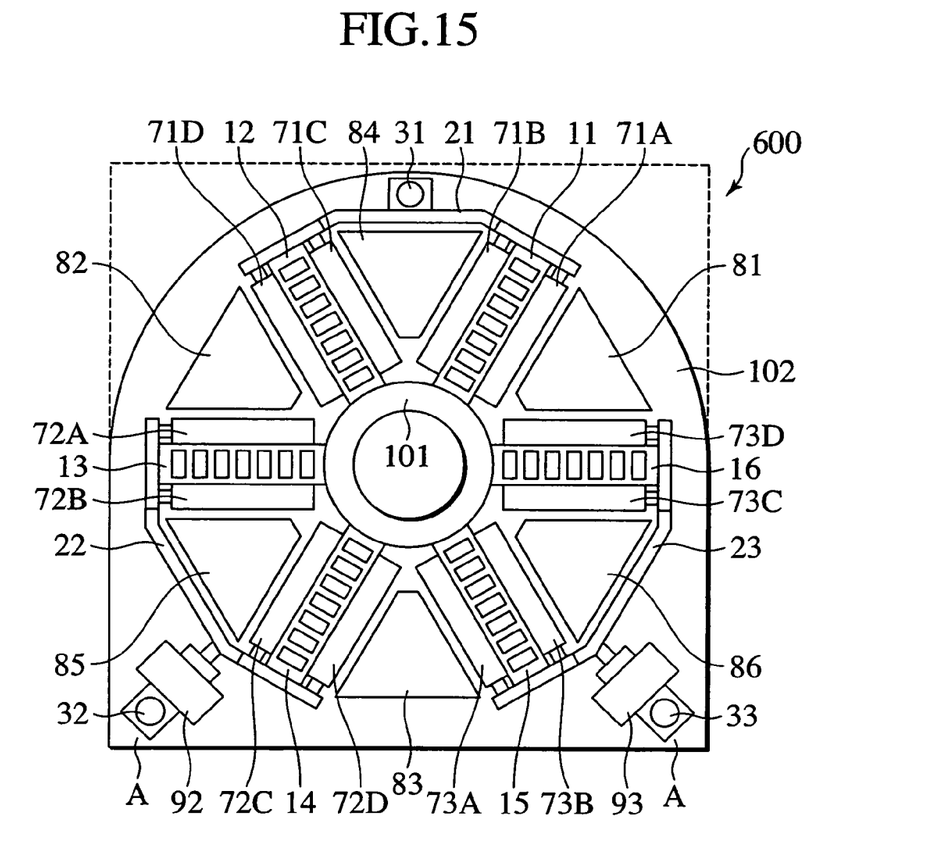
FIG. 15 is a side view of illustrating an internal structure of the power converter shown in FIG. 14 in skeleton form.

FIG. 14 is a perspective view showing an external structure of a unitary structure between the power converter of the presently filed embodiment and the motor, and FIG. 15 is a side view illustrating an internal structure of such a power converter in a skeleton form.

As shown in FIG. 14, a unitary device S2, which is unitarily comprised of a power converter 600, a motor 602 and a gear 603, has a tunnel shape formed in an outer shape with a columnar configuration in two overhangs.

Further, as shown in FIG. 15, in contrast to the structure of the first embodiment shown in FIG. 3A, the power converter 600 includes additional smoothing capacitors 84, 85, 86 whereas the current sensor 91 is deleted, and remaining current sensors 92, 93 and AC output terminals 32, 33 are disposed in two corner sections A protruding from the cross sectional shape of the motor 2 shown in FIG. 3A, that is, the corner sections A that are formed in substantially squared configurations that substantially circumscribe an outer peripheral surface in cross section of the motor 602. The electrodes (bus bars) connected to the AC output terminals 32, 33 extend through the structural member 102 of the motor 602 and are connected to the wirings of the motor 602.

That is, in view of an electrical point, such a structure takes the form of a configuration wherein the smoothing capacitors 84 to 86 are connected to the smoothing capacitors 81 to 83 shown in FIG. 2 in parallel and the U-phase AC output of the power semiconductor module 71 is connected directly to the motor 602 without passing through the current sensor.

Here, in case where a further increased amount of electric power is needed to drive the motor 602, since the power semiconductor modules with further increased sizes are required and the smoothing capacitors also need to have increased capacities followed by an increase in size of the cooler to cause the current sensor to be largely sized with resultant increase in costs, the current sensors may be mounted for two phases among the AC three phases to permit an electric current value of remaining one phase to be obtained through calculation based on values of the two current sensors.

Thus, in case where the component parts forming the power converter 600 becomes large in size, there is a probability wherein a difficulty occurs in accommodating all of the component parts of the power converter in the cross sectional area of the motor 602. On the other hand, when taking the motor 602 formed in the cylindrical shape into consideration in respect of the relationship between lubricating devices and fixing hardware and other on-vehicle equipments, the use of the outer configuration in the substantially squared shape affords a probability to enable the component parts to be arranged in a favorable layout with an improved space efficiency.

Under such circumstances, as indicated in the presently filed embodiment, due to the presence of the current sensors 92, 93 disposed in the corner sections A projecting from the motor 602 in the squared shape as exemplified in the presently filed embodiment, an undesired overhang area can be suppressed, making it possible to miniaturize a unitary device.

In addition, such a structure can be applied to a case even if it has an increased number of corner sections in shape of the motor 602 depending on conditions such as on-vehicle installation capabilities.

Figure 16:
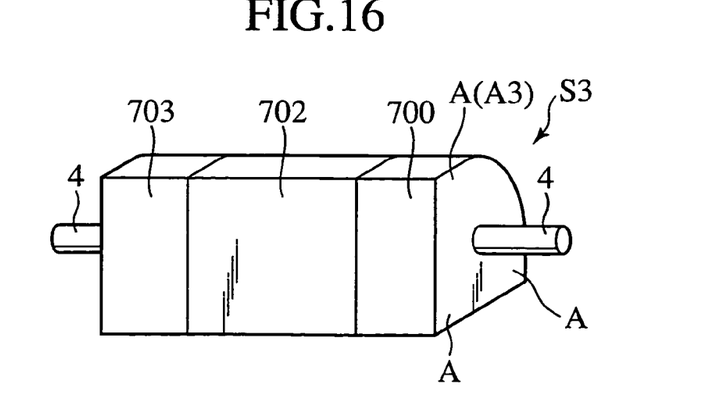
FIG. 16 is a perspective view illustrating an external structure of a unitary device, incorporating a power converter and a motor with corner sections at three positions in another example of the present embodiment.
Figure 17:
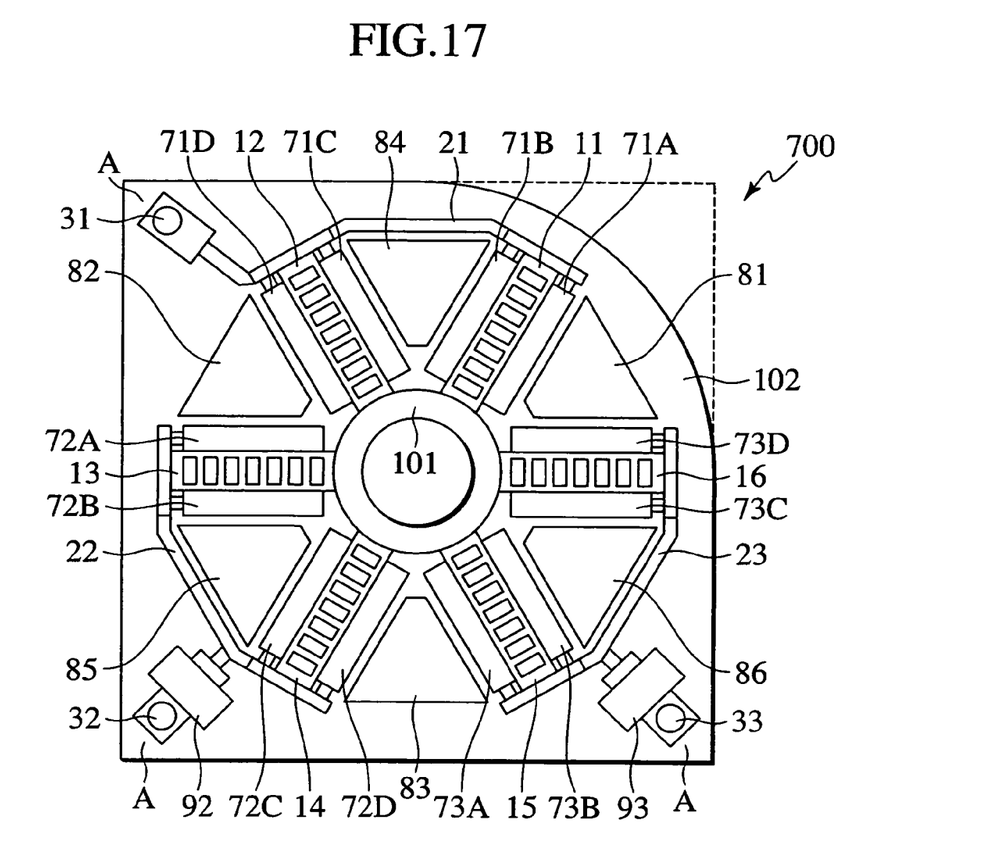
FIG. 17 is a side view of showing an internal structure of the power converter shown in FIG. 16 in skeleton form in another example.
Figure 18:
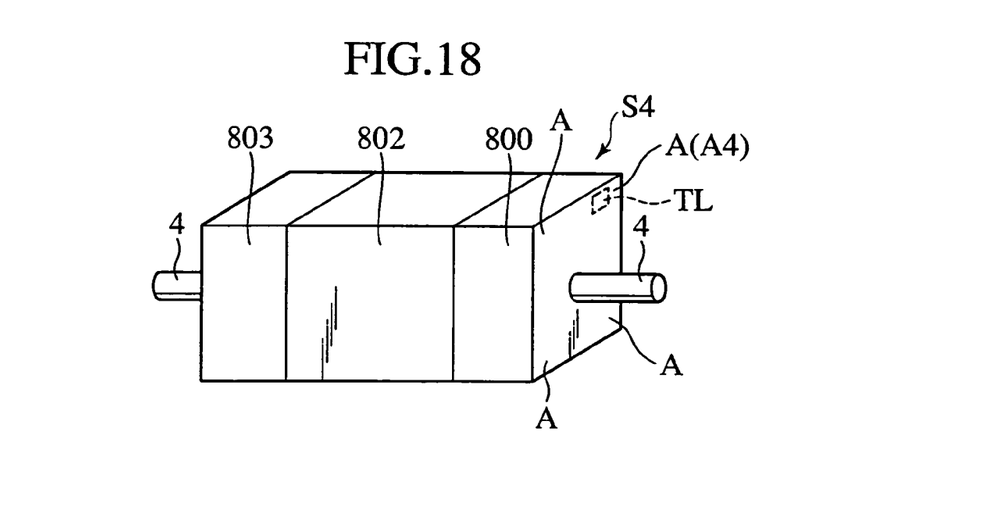
FIG. 18 is a perspective view illustrating an external structure of a unitary device, incorporating a power converter and a motor with corner sections at four positions in another example of the present embodiment.

FIG. 16 is a perspective view illustrating an external structure of a unitary structure (unitary device S3) with a power converter 700, of the presently filed embodiment, having corner sections at three positions, a motor 702 and a gear 703, FIG. 17 is a side view illustrating an internal structure of such a power converter 700 in a skeleton form, and FIG. 18 is a perspective view illustrating a unitary structure (unitary device S4) with a power converter 800, of the other example, having corner sections at four positions, a motor 802 and, further, a gear 803.

As shown in FIGS. 16 and 17, due to an ability of permitting the AC output terminals 31 to be positioned in the corner sections A at three positions projecting from the cross sectional circular shape of the motor 702, i.e., in one corner A3 of the three corner sections, which is increased by one from the structure shown in FIG. 15, the electrode (bus bar) connected to this AC output terminal 31 extends through the structural member 102 at the end face of the motor 702 and is connected to the wirings thereof. Incidentally, it is, of course, needless to say that both the current sensor 91 and the AC output terminal 31 can be incorporated into this additionally increased corner section A3 if desired.

Further, in case where the cylindrical shape of the motor 802 is accommodated in the structural member with the substantially square shape configuration as shown in FIG. 18, the power converter 800 with which the motor 802 is unitarily formed makes it possible for the input terminals TL of such as the positive electrode and the negative electrode of DC power to be accommodated in the fourth corner section A4.

Thus, through effective use of such a fourth corner section, the unitary device can be avoided from being largely sized in structure while permitting the component parts of the power converter 800 to remain in a uniform layout.

Incidentally, it is, of course, possible for such a third embodiment to be also applied to the second embodiment.

From the foregoing, with the structures of the above various embodiments of the present invention, a plurality of pieces of coolers are disposed in the radial directions about the motor axis or the center of the drive shaft, and the power semiconductor modules, through which electric power is supplied to the motor, are mounted on one or both surfaces of the coolers, thereby enabling miniaturization of the power converter.

The entire content of a Patent Application No. TOKUGAN 2003-082873 with a filing date of Mar. 25, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power converter arranged in series and coaxial with a motor along a direction of an output shaft to form a unitary structure through which the output shaft extends, comprising:
a plurality of coolers each of which extends along a radial direction with respect to an output shaft so as to be perpendicular to the output shaft and has a cooling surface defined by a direction parallel to the output shaft and the radial direction, each of the plurality of coolers being formed with a plurality of coolant passageways therein such that each of the plurality of coolant passageways linearly extends along a direction parallel to the radial direction or along a direction parallel to the output shaft; and
a plurality of power semiconductor modules, each of which is mounted on the cooling surface of corresponding one of the plurality of coolers in a symmetric manner relative to the corresponding one of the plurality of coolers, and extends in the radial direction along with the cooling surface of the cooler, to supply electric power to a motor.

2. The power converter according to claim 1, wherein the output shaft includes at least one of a motor shaft and a drive shaft connected to the motor shaft.

3. The power converter according to claim 1, wherein each of the plurality of coolers includes a plurality of cooling surfaces, and each of is defined by the direction parallel to the output shaft and the radial direction.

4. The power converter according to claim 1, wherein each of the plurality of coolers includes a set of coolers opposing to one another, and each of the set of coolers extends along the radial direction.

5. The power converter according to claim 1, wherein each of the plurality of coolers is mounted on a cylindrical structural member surrounding the output shaft.

6. The power converter according to claim 1, wherein each of the plurality of coolers is mounted on a structural member located at an end face of a motor.

7. The power converter according to claim 1, wherein each of the plurality of coolers includes a plurality of coolant passageways extends in parallel to the output shaft.

8. The power converter according to claim 1, wherein each of the plurality of coolant passageways extends along the radial direction.

9. The power converter according to claim 1, wherein an end portion of each of the plurality of coolers is connected to at least one of a delivery conduit communicating with coolant passages of the other of the plurality of coolers and a coolant delivery conduit communicating with a power converter.

10. The power converter according to claim 1, wherein an end portion of each of the plurality of coolers is connected to an annular coolant passage connected to a coolant delivery conduit connected to a power converter.

11. The power converter according to claim 1, further comprising a capacitor disposed between respective ones of the plurality of coolers adapted to smooth a DC voltage.

12. The power converter according to claim 11, wherein the capacitor has a cross sectional shape formed in a fan-shape or a trapezoid.

13. The power converter according to claim 1, wherein each of the plurality of coolers has a pair of cooling surfaces, on each of which one of the plurality of power semiconductor modules is mounted, and terminals of one of the plurality of power semiconductor modules mounted on one of the pair of cooling surfaces has a symmetric relationship with those on the other of the cooling surfaces with respect to corresponding one of the plurality of coolers.

14. The power converter according to claim 1, further comprising a current sensor disposed in a corner section projecting from a cross sectional circular shape of a power converter and detecting output currents of each of the plurality of power semiconductor modules.

15. The power converter according to claim 1, further comprising an AC output terminal disposed in a corner section projecting from a cross sectional circular shape of a power converter and connecting a power converter and a motor.

16. The power converter according to claim 15, wherein the AC output terminal is three-phase AC output terminal and have three output terminals, and each of the three output terminals is disposed in corresponding one of three corner sections projecting from the cross sectional circular shape of the power converter.

17. The power converter according to claim 1, further comprising a DC power input terminal disposed in a corner section, projecting from a cross sectional circular shape of a power converter, in which no other component elements are located.

18. The power converter according to claim 1, wherein the plurality of coolers are arranged along corresponding radial directions, each of which is perpendicular to the output shaft, at circumferentially spaced intervals therebetween.

19. The power converter according to claim 1, wherein:

the power converter and the motor are combined coaxially in series with each other, the radial direction is a direction perpendicularly extending from the output shaft, and the cooling surface is defined by a direction parallel to the output shaft and a direction parallel to the extending direction.

\* \* \* \* \*